United States Patent
Hahn et al.

(10) Patent No.: US 9,002,505 B2
(45) Date of Patent: Apr. 7, 2015

(54) APPARATUS FOR THE HANDLING OF CONTAINERS WITH A MOBILE DISPLAY

(75) Inventors: Wolfgang Hahn, Donaustauf (DE); Markus Zoelfl, Metten (DE)

(73) Assignee: Krones AG (DE)

( * ) Notice: Subject to any disclaimer, the term of this patent is extended or adjusted under 35 U.S.C. 154(b) by 171 days.

(21) Appl. No.: 12/858,330

(22) Filed: Aug. 17, 2010

(65) Prior Publication Data

US 2011/0082582 A1     Apr. 7, 2011

(30) Foreign Application Priority Data

Oct. 1, 2009 (DE) .......................... 10 2009 043 671

(51) Int. Cl.
| | | |
|---|---|---|
| *B29C 45/76* | (2006.01) | |
| *B65G 43/10* | (2006.01) | |
| *G05B 19/409* | (2006.01) | |

(52) U.S. Cl.
CPC .............. *B65G 43/10* (2013.01); *G05B 19/409* (2013.01); *G05B 2219/23406* (2013.01); *G05B 2219/36133* (2013.01); *G05B 2219/36159* (2013.01); *G05B 2219/36163* (2013.01); *G05B 2219/36169* (2013.01)

(58) Field of Classification Search
USPC .......................... 700/213, 214, 225, 228, 230
See application file for complete search history.

(56) References Cited

U.S. PATENT DOCUMENTS

| | | | | |
|---|---|---|---|---|
| 6,145,022 A | * | 11/2000 | Takizawa et al. ................ 710/10 |
| 6,904,333 B2 | * | 6/2005 | Morimura ...................... 700/197 |
| 6,996,402 B2 | * | 2/2006 | Logan et al. ................ 455/456.1 |
| 7,349,747 B2 | * | 3/2008 | Saito et al. ...................... 700/83 |
| 7,391,336 B2 | * | 6/2008 | Wakabayashi et al. ........ 340/679 |
| 7,640,007 B2 | * | 12/2009 | Chen et al. .................. 455/414.1 |
| 2002/0031567 A1 | * | 3/2002 | Magario ........................ 425/135 |
| 2007/0061041 A1 | * | 3/2007 | Zweig ............................ 700/245 |
| 2008/0121494 A1 | * | 5/2008 | De Maeyer .................... 198/317 |
| 2008/0142129 A1 | * | 6/2008 | Reasner et al. ................ 150/131 |
| 2010/0016997 A1 | | 1/2010 | Ramsauer et al. .............. 700/79 |

FOREIGN PATENT DOCUMENTS

| | | | | |
|---|---|---|---|---|
| CN | 1287968 C | 12/2006 | .............. | B29C 45/76 |
| DE | 199 51 233 | 5/2000 | .............. | G05B 19/409 |
| DE | 100 51 449 | 4/2002 | .............. | B66F 9/24 |
| DE | 100 58 021 | 6/2002 | .............. | B66B 9/187 |
| DE | 10 2005 049 098 | 4/2007 | .............. | B60K 37/00 |
| DE | 38 13 590 | 10/2013 | .............. | B23Q 11/00 |

(Continued)

OTHER PUBLICATIONS

EPO Communication issued in corresponding EPO Patent Appln. No. 10 175 180.8-1807 dated Oct. 7, 2013 (9 pgs).

(Continued)

*Primary Examiner* — Patrick Mackey

(74) *Attorney, Agent, or Firm* — Hayes Soloway P.C.

(57) ABSTRACT

An apparatus for handling containers, with at least one handling device which handles the containers in a pre-set manner, a conveying device which conveys the containers along a pre-set conveying path, with a control device for controlling the apparatus, with an input unit, by way of which information is capable of being entered in the apparatus by a user. The apparatus has an information output unit for delivering information to the user, wherein this information unit is made portable and is capable of being brought into at least indirect communication connection with the input unit.

20 Claims, 1 Drawing Sheet

(56) References Cited

FOREIGN PATENT DOCUMENTS

| | | | |
|---|---|---|---|
| EP | 1393880 | 3/2004 | ............... B29C 45/76 |
| GB | 2422234 | 7/2006 | ............ G05B 19/418 |
| WO | WO2008049518 | 5/2008 | ............ G05B 19/418 |

OTHER PUBLICATIONS

Office Action issued in related U.S. Appl. No. 14/320,096, dated Oct. 3, 2014 (17 pgs).

\* cited by examiner

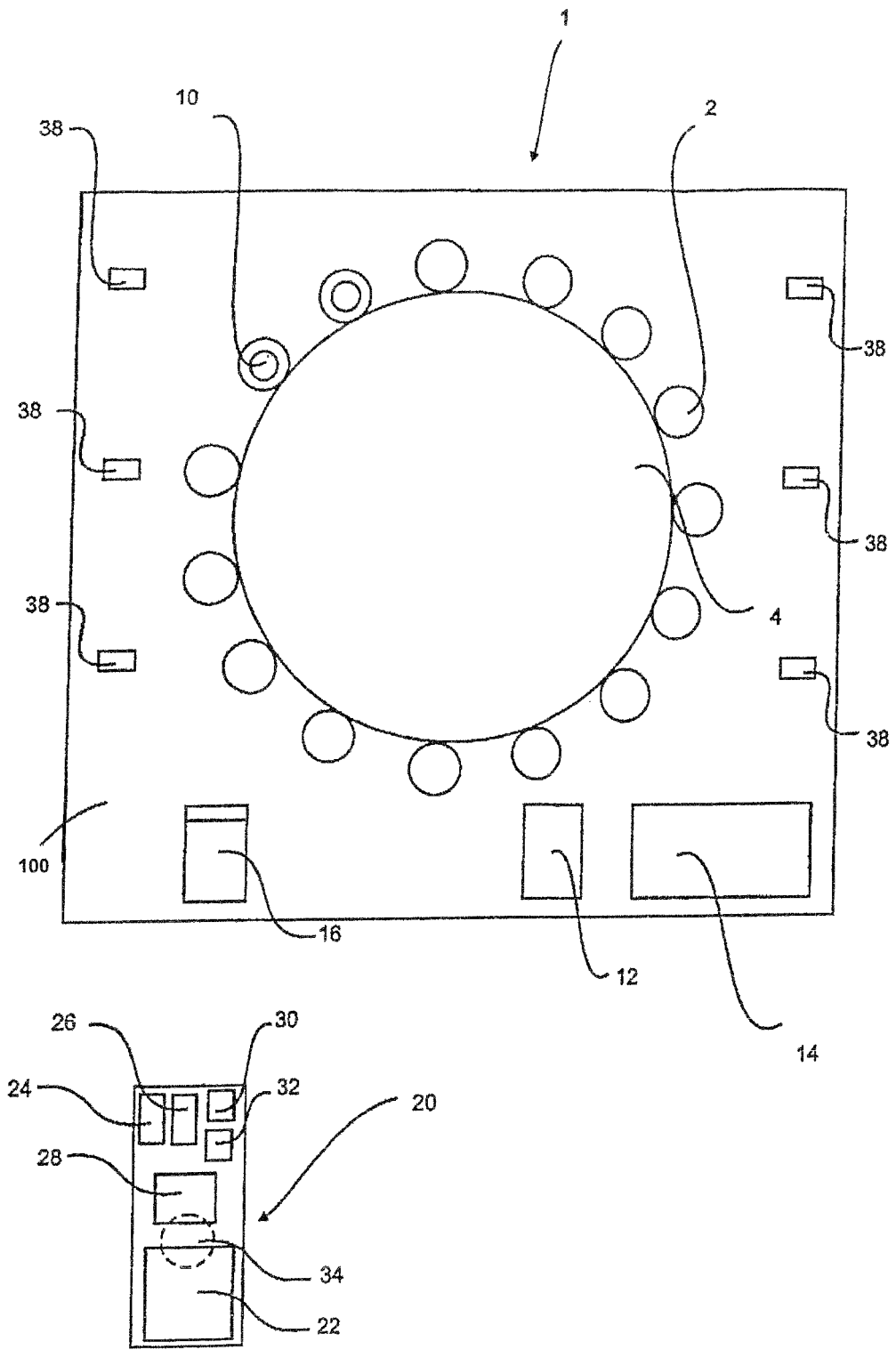

APPARATUS FOR THE HANDLING OF CONTAINERS WITH A MOBILE DISPLAY

DESCRIPTION BACKGROUND OF THE INVENTION

The present invention relates to an apparatus for the handling of containers and, in particular, drinks containers. Apparatus of this type, such as for example labelling machines, filling machines or blow-moulding machines for plastics containers are known from the prior art. In this case what is generally involved are very large plants, the whole of which cannot be kept in view by the user. These machines usually have an operating panel for operating the machine. As a rule the operating panels are arranged stationary or at most in a pivotable manner on the machine.

An operating panel of this type is known for example from DE 10 2005 049 098 A1. This operating panel also has a display unit in a central region. A mobile operating machine with two operating panels, which is designed in such a way that only one operating panel in each case is in an active state, is known from DE 100 51 449 A1.

A hoist with a platform movable on a mast is known from DE 100 58 021 A1. In this case the control devices of this hoist have associated with them a mobile operating panel which is capable of being connected to the control devices of the hoist in a selective manner by way of plug-in connections. In this way a control of the hoist is capable of being operated from a multiplicity of different positions. In the case of the above-mentioned plants for the handling of containers, however, such a procedure is undesired on grounds of safety. The actual operation should rather be carried from only one specified position.

In practice, however, values saved in the operating panel or touch panel, such as for example setting values, are also needed for example at those places which cannot be kept in view or cannot be reached from the position of the operating panel. In this case the operator of the machine has to memorize or write down the respective values from the operating panel. This also applies in a corresponding manner to setting values which have to be saved in the operating panel and originate for example from other parts of the plant. In particular, in the case of a multiplicity of parts of the plant this is a very laborious procedure.

In addition, other information, such as for example directions on overcoming faults (troubleshooting) or for refitting the plant, are likewise not available in situ but the user has to memorize them. For this reason, loss of time and additional journeys to and from the operating panel occur during the operation of the plant. In addition, the fact that the user has to memorize specific values can result in possible losses of data or even defective operation of the plant.

The object of the present invention is therefore to simplify the operation of apparatus for the handling of containers and, in particular, drinks containers. In addition, the reliability of plants of this type in operation should be increased.

SUMMARY OF THE INVENTION

An apparatus according to the invention for the handling of containers has at least one handling device which handles the containers in a pre-set manner, a conveying device which conveys the containers along a pre-set conveying path, and a control device for controlling the apparatus. In addition, the apparatus has an input unit, by way of which information or commands are capable of being entered in the apparatus by a user and by way of which the apparatus is capable of being operated.

According to the invention the apparatus has at least one information output unit for delivering information to the user, this information unit being made portable or mobile and capable of being brought into at least indirect communication connection with the input unit.

The handling of containers is to be understood as being any type of action upon the containers, such as in particular the production of plastics pre-forms, the blow-moulding of plastics pre-forms to form plastics containers, the filling of containers, the sterilization of containers, the labelling of containers, the conveying of containers and the like. The input unit can be for example, an operating panel or a touch panel by which the user can transmit commands or data to the machine. In addition it is possible for an operating panel of this type to permit the pre-setting or altering of machine parameters.

An at least indirect bringing into communication connection is to be understood that the information output unit can both be capable of being directly connected to the input unit or, on the other hand, that other elements can also be interposed, such as for example the control device of the apparatus or the like. In particular, however, a transmission of information or data between the input device and the information output unit in at least one direction, preferably in both directions, is made possible by the communication connection.

It is thus proposed to provide an additional mobile information output unit or display which is independent of the operating panel and which the user can take along to any location of the apparatus so as thereby to bring data in a simple manner to the places at which they can be used or, for example, compared with other data. After use, the information output unit can be deposited for example in the vicinity of the operating panel, in particular in a so-called docking station.

In an advantageous embodiment the information output unit has a display device, i.e. a device which displays information for the user in a visually perceptible manner Other output possibilities, however, such as for example acoustic signals, speech output and/or possibly also tactile output, would also be feasible.

It is preferable for the information output unit to have a fastening device which has a detachable fastening of the information output unit to different areas of the apparatus. This fastening device can be for example a magnetic fastening device by which the information output unit can be arranged for a short time at any desired locations of the apparatus. In this way, the user can attach the information output unit for a short time to any desired locations of the plant in order to be able to read out information in a convenient manner for example. It would also be possible, however, for the fastening device to be clamp connection, a clip connection, a snap-closure connection or the like, which is capable of being attached at least to specific pre-set areas of the apparatus.

In the case of a further advantageous embodiment the information output unit is designed for at least temporary stand-alone operation. In this way the information output unit preferably has an energy source such as for example a chargeable battery.

In the case of a further advantageous embodiment the information output unit has a transmission device for the wireless transmission of signals to the input unit. In this way the user can enter information into the information output unit at specific areas of the machine for example and this information can be transmitted or sent to the input unit. In this case these data are transmitted to the input unit, in particular in a wireless manner, but it would also be possible for the information output unit to be connected to the input unit by way of a cable connection.

In addition, the apparatus can have a charging station or docking station in which the information output unit can be set down, in particular in a rest mode. While the information output unit is remaining in this docking station it is also possible for information to be exchanged between the input unit or other areas of the apparatus and the information output unit.

In the case of a further advantageous embodiment the information output unit has a memory device for storing data at least temporarily. In this way for example, data can be entered by the user in the information output unit and stored there. It would also be possible, however, for data from the input unit to be stored in the information output unit. In addition, it is also possible for specific data to be saved in the memory device in advance or by the manufacturer.

In the case of a further advantageous embodiment the information output unit has an information input device, by way of which information can be entered in the information output unit. This information input device can be for example a keypad, by means of which the user enters data, which he or she can read off from specified areas of the machine for example, into the information output unit.

In this case it is possible for data then entered to be read by the information output unit into the input device of the apparatus or machine.

In the case of a further advantageous embodiment the information output unit has an identification unit which associates a specified information output unit with a specified input device of the plant. In this way for example, an address which clearly identifies the information output unit can be saved in the information output unit. Furthermore, it would also be possible for a history of the changes carried out to be saved in the memory device of the information output unit. In this way it is always possible for a user to see whether specific changes have already been made, for example by another user.

In addition, it would be possible for an identification signal to be emitted from individual parts of the plant which clearly identifies the latter, so that the information output unit can clearly establish with which parts of the plant or with which input device it is currently communicating.

As a result of the provision of an address it is possible for data to be read out only by a special information output unit or transmitted to the input device.

It is preferable for the apparatus to have a localization unit in order to determine a position of the information output unit with respect to the apparatus. In this way, for example, it is possible to establish automatically in which area of the apparatus or in the vicinity of which systems of the apparatus the information output unit is present at a specified point in time. In this way that information which is relevant just for those parts of the plant in which the information output unit is present could be delivered to the information output unit. A localization unit of this type could have for example a beacon system, in which case the apparatus has arranged on it a plurality of beacons which are capable of precisely determining by interaction the actual position of the information output unit. In addition, a GPS or (a plurality of) acceleration sensors could also be used.

It is preferable for the apparatus to have at least one reception device for receiving the information output unit. This can be receiving pockets which are present for example on parts of the housing or in columns of the apparatus and in which the information output unit is inserted for protection against damage. This reception device could have a pivotable flap so that the information output unit could be deposited in a completely protected manner. In addition, it would also be possible for a docking station for the information output unit to be incorporated in the reception device.

In the case of a further advantageous embodiment the apparatus has a locating device for the information output device. In this way it is possible for a search signal to be generated from the apparatus or the input device at the wish of the user and to be transmitted to the information output unit, the signal then causing the information output unit itself to emit, in particular, an acoustically perceptible signal so that it can be located more easily by a user.

In the case of a further advantageous embodiment the information output unit has a receiver device for receiving signals. In this way the information output unit can receive from the input device for example signals or data which the user can then read off at the desired locations of the apparatus and can use for example for adapting the plant.

It is preferable for the information output unit to be capable of being brought into communication connection with at least one further device of the apparatus. This further device can be for example various further modules of the apparatus as a whole, such as for example a blow-moulding module or a filling unit. In this way, changed parameters can be automatically adopted in the information output unit, so that the risk of error is further reduced. In addition, it would be possible for the information output unit to be brought into communication connection with further appliances, such as for example a superordinated analysis system. In this way, data of individual parts of the plant could be administered more easily in a central administration system.

In the case of a further advantageous embodiment the information input unit has a comparison device which compares data stored in the memory device with data entered by way of the information input device. In this way, a very quick data synchronization can be carried out and for example a very quick check can be made as to whether changes made by the user are advisable. The data saved in the memory device can be for example specific values characteristic of different parts of the plant.

In the case of a further advantageous embodiment, provision is made to prevent operation of the apparatus by the information output unit. This means that in this case the information output unit represents only a passive appliance which is primarily used for information purposes for the user, but control of the apparatus or possibly even an active changing of data and values which are relevant for the operation of the apparatus is not possible. This embodiment is relevant in view of safety, since it is just necessary to prevent operation of the apparatus by the information output unit.

In the case of a further advantageous embodiment the information output unit has information read-out means for reading out information of devices of the apparatus. In this way the information output unit could have for example a barcode scanner which detects barcodes of parts of the plant or even of material to be processed or of labels or the like, and in response to this supplies the user with information on necessary changes for example.

It is advantageous for at least one device of the apparatus to be adjustable with respect to at least one parameter. This can be for example settings for a blow-moulding machine or the like. The information output unit according to the invention acts as an auxiliary device to facilitate such settings of the parameters for the user.

It is advantageous for at least one signal, which is characteristic of this named parameter, to be capable of being communicated between the information output unit and the input unit. In this way the parameters relevant to the machine can easily be read out. In particular, a signal of this type or the parameter can be transmitted from the input unit to the information output unit.

BRIEF DESCRIPTION OF THE DRAWING

Further advantages and embodiments may be seen in the accompanying FIGURE. In the FIGURE FIG. 1 is an outline diagrammatic illustration of an apparatus according to the invention.

DETAILED DESCRIPTION OF THE INVENTION

FIG. 1 is an outline diagrammatic illustration of an apparatus 1 according to the invention. In FIG. 1 the invention is illustrated with reference to a blow-moulding machine, but it is pointed out that the invention is also capable of being applied to other plants and in particular, to plants which are used for the manufacture and handling of containers.

The reference number 4 designates a conveying device such as for example a blow-moulding wheel on which a plurality of blow-moulding stations 2 are arranged which are used for the blow-moulding of plastics pre-forms to form containers. The reference number 14 designates an input unit by way of which the user can transmit information and control commands to the apparatus 1. This input unit 14 can be a keypad or even a touch screen for example.

The reference number 12 designates a control device for controlling the apparatus. In this case this control device 12 can receive commands or information from the input unit and can thus carry out the control of the plant.

The reference number 20 designates in its entirety a portable information output unit which in this case has been shown greatly exaggerated in size as compared with the apparatus 1. This information output unit has a display device 22 as a display by which data entered or to be entered by a user can be shown.

The reference number 34 designates a fastening device by which the information output unit can be arranged on different areas of the apparatus, such as for example on different areas of a housing wall of the apparatus 1. This fastening device can be for example a permanent magnet.

Data can be entered by the user into the information exchange unit by way of an information input device 28, such as for example a keypad. In this way, it is possible for example for the user to change or set specified parameters or values on specified parts of the plant and to enter these values manually into the information output unit 20 by way of the information input device.

The information output unit 20 can communicate with further appliances and, in particular, with the input unit 14 by way of a transmission device 24, so that values noted by the user can also be transmitted directly to the input unit 14, so as thereby to eliminate a further source of error.

Data, such as for example values entered by the user and even data which the information output unit 20 has received from other appliances such as for example the input unit 14, can be stored in a memory device 26 of the information output unit.

The reference number 30 designates a localization unit for the information output unit. A local position of the information output unit can be set by means of this localization unit. To this end, the apparatus can have provided on or within a wall 100 of the apparatus transmitting or receiving units such as beacons 38 which localize the localization unit or the information output unit. An indication as to where the information output unit is currently situated can be given to the user by way of a suitable display device in the region of the input unit 14. Localization of the information output unit in an area of less than 10 cm is possible by way of a beacon system of this type.

The information output unit 20 can receive signals or parameters from other parts of the plant by way of a receiver device 32. The reference number 16 designates a receptacle device for receiving the information output unit 20. This receptacle device 16 can have a flap (not shown in detail) which is capable of being swung out of a housing wall for example. It is also possible for a docking station (not shown) for the information output unit 20 to be incorporated in this receptacle device.

All the features disclosed in the application documents are claimed as being essential to the invention, insofar as they are novel either individually or in combination as compared with the prior art.

LIST OF REFERENCES 1 apparatus
2 handling device
4 conveying device, blow-moulding wheel
10 container
12 control device
14 input unit
16 receptacle device
20 information output unit
22 display device
24 transmission device
26 memory device
28 information input device
30 localization unit
32 receiver device
34 fastening device
38 beacon

The invention claimed is:

1. An apparatus for the handling of containers,
said apparatus having at least one wall and comprising at least one handling device which handles the containers in a pre-set manner,
a conveying device which conveys the containers along a pre-set conveying path, and,
a control device for controlling the apparatus, said control device including an input unit, by way of which information is capable of being entered in the apparatus by a user,
wherein the apparatus has at least one information output unit for delivering information to the user, wherein this information unit is portable and is capable of being brought into at least indirect communication connection with the input unit,
wherein the information output unit has a fastening device which has a detachable fastening of the information output unit to different areas of the apparatus, and
wherein the apparatus has a localization unit in order to determine a position of the information output unit with respect to the apparatus, wherein information for those parts of the apparatus in which the information unit is present can be delivered to the information output unit, and wherein the apparatus has a beacon system, comprising a plurality of beacons provided at different positions inside said wall within said apparatus, which plurality of beacons together are capable of determining an actual position of the information output unit, to an area of less than 10 cm.

2. The apparatus according to claim 1, wherein the information output unit has a display device.

3. The apparatus according to claim 1, wherein the information output unit has a transmission device for the wireless transmission of signals to the input unit.

4. The apparatus according to claim 1, wherein the information output unit has a memory device for storing data at least temporarily.

5. The apparatus according to claim 1, wherein the information output unit has an information input device, by way of which information can be entered in the information output unit.

6. The apparatus according to claim 1, wherein the apparatus has at least one receptacle device for receiving the information output unit.

7. The apparatus according to claim 1, wherein the information output unit has a receiver device for receiving signals.

8. The apparatus according to claim 7, wherein the receiving device is a receiving pocket which is present on a part of the housing of the apparatus.

9. The apparatus according to claim 1, wherein the information output unit is capable of being brought into communication connection with at least one further device of the apparatus.

10. The apparatus according to claim 1, wherein the information input unit has a comparison device which compares data stored in the memory device with data entered by way of the information input device.

11. The apparatus according to claim 1, wherein provision is made to prevent operation of the apparatus by the information output unit.

12. The apparatus according to claim 1, wherein the information output unit has information read-out for reading out information of devices of the apparatus.

13. The apparatus according to claim 1, wherein at least one device of the apparatus is adjustable with respect to at least one parameter.

14. The apparatus according to claim 13, wherein at least one signal, which is characteristic of the parameter (P), is capable of being communicated between the information output unit and the input unit.

15. The apparatus according to claim 1, wherein the handling of the containers is a blow moulding of plastic preforms to form plastics containers, filling of said containers, and sterilization or labeling of said containers.

16. The apparatus according to claim 1, wherein the fastening device is a magnetic fastening device.

17. The apparatus according to claim 1, wherein the information output unit has an identification unit, which associates a specified information output unit with a specified input device of the apparatus.

18. The apparatus according to claim 1, wherein the information unit has information read-out for reading out information of devices of the apparatus.

19. The apparatus according to claim 1, wherein individual parts of the plant provide an emitter each to send a respective identification signal which clearly identifies the individual parts of the plant, so that the information output unit can clearly establish with which parts of the plant or with which input device it is currently communicating.

20. The apparatus according to claim 1, wherein the beacons include transmitting or receiving units which localize the localization unit on the information output unit.

* * * * *